United States Patent
Peng

(10) Patent No.: US 12,430,497 B2
(45) Date of Patent: Sep. 30, 2025

(54) DOCUMENT EDITING METHOD AND APPARATUS, AND ELECTRONIC DEVICE

(71) Applicant: DOUYIN VISION CO., LTD., Beijing (CN)

(72) Inventor: Longteng Peng, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 54 days.

(21) Appl. No.: 18/017,624

(22) PCT Filed: Jul. 29, 2021

(86) PCT No.: PCT/CN2021/109160
§ 371 (c)(1),
(2) Date: Jan. 23, 2023

(87) PCT Pub. No.: WO2022/022619
PCT Pub. Date: Feb. 3, 2022

(65) Prior Publication Data
US 2023/0297767 A1   Sep. 21, 2023

(30) Foreign Application Priority Data
Jul. 30, 2020 (CN) .......................... 202010755676.7

(51) Int. Cl.
*G06F 40/166* (2020.01)
*G06Q 10/109* (2023.01)

(52) U.S. Cl.
CPC ......... *G06F 40/166* (2020.01); *G06Q 10/109* (2013.01)

(58) Field of Classification Search
CPC .. G06F 3/48–05; G06F 40/166; G06Q 10/109
See application file for complete search history.

(56) References Cited

U.S. PATENT DOCUMENTS 6,405,224 B1 * 6/2002 Van Der Meer ...... G06F 40/166
707/E17.112
6,961,896 B1 * 11/2005 Rousselle ............. G06F 40/166
715/205

(Continued)

FOREIGN PATENT DOCUMENTS

CN   101501713 A   8/2009
CN   104301420 A   1/2015

(Continued)

OTHER PUBLICATIONS

International Patent Application No. PCT/CN2021/109160; Search Report; dated Oct. 27, 2021; 2 pages.

*Primary Examiner* — Daniel Rodriguez
(74) *Attorney, Agent, or Firm* — BakerHostetler

(57) ABSTRACT

A document editing method and apparatus, and an electronic device. The method comprises: in response to receiving an invoking request for a calendar function in a document, displaying a calendar in the document (101); in response to receiving a first adding request for adding a target event corresponding to target time to the calendar, adding the target event to the calendar (102); and displaying, in the document, a target calendar in which the target event is added (103). The target event can be displayed in the document by means of the target calendar, so that it is convenient for document editors or other users related to the document to intuitively see, when viewing the document, specific events that need to be executed at specific time points.

20 Claims, 5 Drawing Sheets

(56) References Cited

U.S. PATENT DOCUMENTS

| | | | | |
|---|---|---|---|---|
| 8,082,308 | B1* | 12/2011 | Filev | G06F 9/468 |
| | | | | 709/204 |
| 8,290,902 | B1* | 10/2012 | Shaver | G06F 40/166 |
| | | | | 707/620 |
| 8,553,039 | B1* | 10/2013 | Boice | G06T 11/206 |
| | | | | 345/473 |
| 8,949,275 | B1* | 2/2015 | Aasuri-Maringanti | |
| | | | | G06F 16/34 |
| | | | | 707/791 |
| 9,785,916 | B2* | 10/2017 | Kanjilal | G06Q 10/109 |
| 11,075,871 | B2* | 7/2021 | Soni | H04L 51/42 |
| 2002/0165891 | A1* | 11/2002 | Kroeger | G06Q 10/10 |
| | | | | 718/100 |
| 2006/0123346 | A1* | 6/2006 | Totman | H04L 51/56 |
| | | | | 715/748 |
| 2006/0143613 | A1* | 6/2006 | Lippe | G06Q 10/06 |
| | | | | 718/100 |
| 2012/0272192 | A1* | 10/2012 | Grossman | G06F 40/197 |
| | | | | 715/854 |
| 2014/0351693 | A1* | 11/2014 | Glassop | G06Q 10/10 |
| | | | | 715/235 |
| 2014/0365886 | A1* | 12/2014 | Koenig | G06F 3/04855 |
| | | | | 715/711 |
| 2015/0178331 | A1* | 6/2015 | Tyagi | G06Q 10/00 |
| | | | | 707/736 |
| 2015/0193391 | A1* | 7/2015 | Khvostichenko | G06Q 10/109 |
| | | | | 715/205 |
| 2015/0193392 | A1* | 7/2015 | Greenblatt | G06Q 10/109 |
| | | | | 715/205 |
| 2015/0199317 | A1* | 7/2015 | Lemonik | G06F 9/44526 |
| | | | | 715/255 |
| 2015/0261732 | A1* | 9/2015 | Kim | G06Q 10/101 |
| | | | | 715/229 |
| 2016/0148162 | A1* | 5/2016 | Du | G06Q 50/01 |
| | | | | 705/7.18 |
| 2016/0203444 | A1 | 7/2016 | Frank et al. | |
| 2017/0185574 | A1* | 6/2017 | Fern | G06F 40/117 |
| 2017/0185966 | A1* | 6/2017 | Li | G06F 3/0482 |
| 2018/0077103 | A1* | 3/2018 | Soni | G06Q 10/101 |
| 2019/0114046 | A1* | 4/2019 | Weinstein | H04L 51/08 |
| 2020/0293975 | A1* | 9/2020 | Faulkner | G06Q 10/063114 |
| 2020/0363910 | A1* | 11/2020 | Engrav | G06F 16/26 |
| 2023/0196002 | A1* | 6/2023 | Kawato | G06F 40/166 |
| | | | | 715/256 |
| 2023/0297767 | A1* | 9/2023 | Peng | G06Q 10/109 |
| | | | | 715/209 |

FOREIGN PATENT DOCUMENTS

| | | |
|---|---|---|
| CN | 104657846 A | 5/2015 |
| CN | 104683590 A | 6/2015 |
| CN | 104915367 A | 9/2015 |
| CN | 105931026 A | 9/2016 |
| CN | 110839104 A | 2/2020 |
| CN | 111045999 A | 4/2020 |
| CN | 111931464 A | 11/2020 |

* cited by examiner

DOCUMENT EDITING METHOD AND APPARATUS, AND ELECTRONIC DEVICE

CROSS REFERENCE TO RELATED APPLICATION

The present application is a national phase application of PCT international patent application PCT/CN2021/109160, filed on Jul. 29, 2021, which claims priority to Chinese Patent Application No. 202010755676.7, titled "DOCUMENT EDITING METHOD AND APPARATUS, AND ELECTRONIC DEVICE", filed on Jul. 30, 2020, with the China National Intellectual Property Administration, both of which are incorporated herein by reference in their entireties.

FIELD

The disclosure relates to the field of Internet technology, and in particular to a document editing method, a document editing apparatus and an electronic device.

BACKGROUND

In recent years, due to the convenience of distributing, storing and editing electronic documents and the development of various electronic document processing programs for document processing, the development of electronic documents has become increasingly vigorous.

When using documents (for example, the above-mentioned electronic documents that can be edited or browsed online by multiple users) to record work or writing documents, a user may write specific words or pictures in the documents, or insert tables in the documents. When the user finishes editing the documents, other users may browse the documents.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

A document editing method, a document editing apparatus and an electronic device are provided according to the embodiments of the present disclosure. A target event may be displayed in a document through a target calendar, so that a document editor or other users related to the document, when viewing the document, can visually see specific events that need to be performed at a specific time point.

In a first aspect, a document editing method is provided according to an embodiment of the disclosure. The method includes: displaying, in response to receiving an invoking request for invoking a calendar function in a document, a calendar in the document; adding, in response to receiving a first addition request for adding a target event corresponding to target time in the calendar, the target event in the calendar; and displaying a target calendar added with the target event in the document.

In a second aspect, a document editing method is provided according to an embodiment of the disclosure. The method includes: creating, in response to receiving a calendar information creating request sent from a terminal device, calendar information matched with user identity information of a user and/or document information, where the calendar information creating request is generated according to an invoking request for invoking a calendar function in a document from the user; receiving a third adding request sent from the terminal device, and associating a target event and target time corresponding to the target event with the calendar information, where the third adding request is generated by the terminal device according to a first adding request of adding the target event corresponding to the target time in the displayed calendar from the user; and sending an association result to the terminal device.

In a third aspect, a document editing apparatus is provided according to an embodiment of the disclosure. The apparatus includes: a first displaying module, configured to display, in response to receiving an invoking request for invoking a calendar function in a document, a calendar in the document; a first adding module, configured to add, in response to receiving a first addition request for adding a target event corresponding to target time in the calendar, the target event in the calendar; and a second displaying module, configured to display a target calendar added with the target event in the document.

In a fourth aspect, a document editing apparatus is provided according to an embodiment of the disclosure. The apparatus includes: a creating module configured to create, in response to receiving a calendar information creating request sent from a terminal device, calendar information matched with user identity information of a user and/or document information, where the calendar information creating request is generated according to an invoking request for invoking a calendar function in a document from the user; an associating module configured to receive a third adding request sent from the terminal device, and associate a target event and target time corresponding to the target event with the calendar information, where the third adding request is generated by the terminal device according to a first adding request of adding the target event corresponding to the target time in the displayed calendar from the user; and a first sending module configured to send an association result to the terminal device.

In a fifth aspect, an electronic device is provided according to an embodiment of the present disclosure. The electronic device includes one or more processors and a storage apparatus storing one or more programs. The one or more programs, when executed by the one or more processors, cause the one or more processors to perform the document editing method described in the above first aspect or the document editing method described in the above second aspect.

In a sixth aspect, a computer-readable medium is provided according to an embodiment of the present disclosure. The computer-readable medium stores a computer program. The computer program, when executed by a processor, causes the processor to perform the document editing method described in the above first aspect or the document editing method described in the above second aspect.

According to the document editing method, the document editing apparatus and the electronic device provided in the embodiments of the disclosure, a calendar is firstly displayed in a document in response to receiving an invoking request for invoking a calendar function in the document, then a target event is added in the calendar in response to receiving a first addition request for adding the target event corresponding to target time in the calendar; and finally a target calendar added with the target event is displayed in the document. In this way, the target event may be displayed in the document through the target calendar, so that a document editor or other users related to the document, when viewing the document, can visually see specific events that need to be performed at a specific time point.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION

Figure 1:
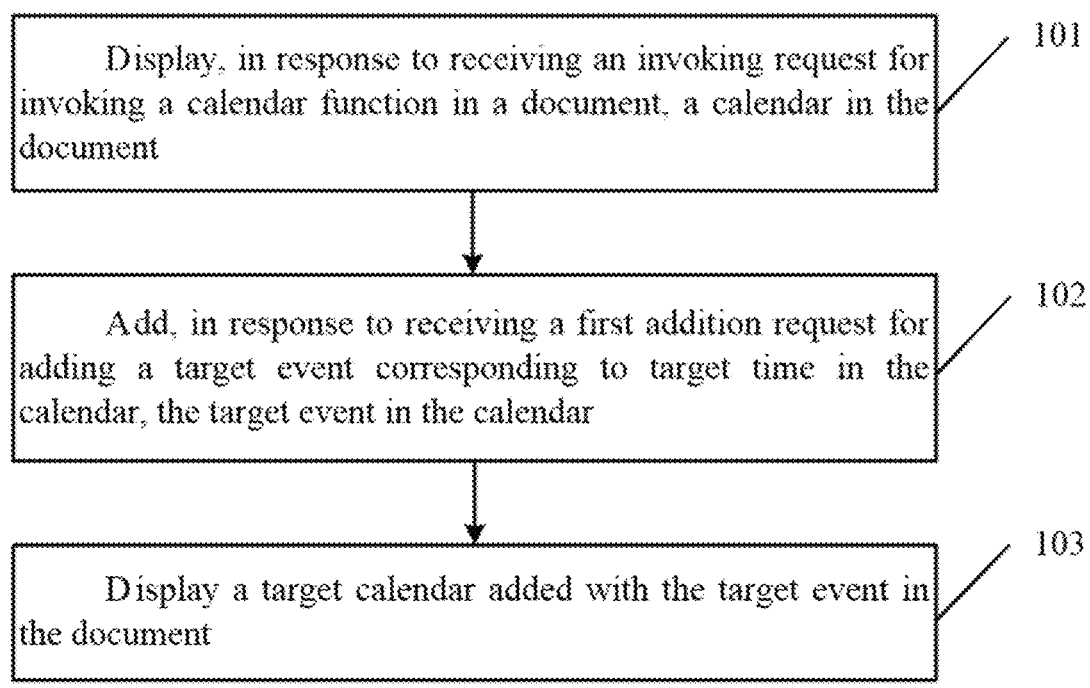
FIG. 1 is a flowchart of a document editing method according to an embodiment of the present disclosure.

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

It should be noted that the embodiments and features in the embodiments of the present disclosure may be combined with each other without conflict.

The disclosure relates to an interaction system, which includes a terminal device and a server terminal.

The terminal device may include tablet computers, mobile communication devices, desktop computers or any other computing devices that can substantially perform document editing operations. A client installed on the terminal device may be a browser or an application program. A user may edit and display documents through the browser or the application program.

The serving terminal may include a device that provides services for the terminal device. For example, the serving terminal may be a Web server, which can provide document identity information of the document to a Web client such as the browser, and can also store the calendar information edited in the document. When receiving a viewing request for viewing a document sent by the terminal device, a document corresponding to the viewing request may be determined based on the viewing request, and the document is sent to the terminal device. The document here may include electronic documents, such as electronic documents edited in a text editor application (such as word). These electronic documents may be edited and displayed on multiple terminal devices through the service provided by the serving terminal.

In the above interaction system, in response to receiving an invoking request for invoking a calendar function in a document, the terminal device may send a calendar information creating request corresponding to the invoking request to the serving terminal; when receiving the call request for calendar function in the document; in response to receiving the calendar information creating request, the serving terminal may create calendar information matched with user identity information of a user and/or document information; after the calendar information is successfully created, the created calendar information may be sent to the terminal device; after receiving the calendar information, the terminal device may display a corresponding calendar in the document. In response to receiving a first adding request of adding the target event corresponding to the target time in the calendar information, the terminal device may generate a corresponding third adding request according to the first adding request, and send the third adding request to the serving terminal; after receiving the third adding request, the serving terminal may associate the target event and the target time corresponding to the target event with the calendar information, and send an association result to the terminal device; after receiving the association result representing successful association, the terminal device may display the target calendar successfully added with the target event in the document. Through the cooperation between the terminal device and the serving terminal, the calendar information in the current document can be visually displayed to the user, so that document editing users or other users related to the document can know the specific events that can be performed at a specific time point, thereby improving the user experience.

Reference is made to FIG. 1, which is a flowchart of a document editing method according to an embodiment of the present disclosure. As shown in FIG. 1, the document editing method may include the steps 101 to 103.

Step 101, display, in response to receiving an invoking request for invoking a calendar function in a document, a calendar in the document.

A terminal device may display a document that a user wants to browse on a display interface in response to a request for acquiring the document from the user. The display interface may be a display interface of a touch screen, and the user may edit the document by touching a corresponding display area. The display interface may also be a display interface with only a display function. The user may select a corresponding display area through a mouse and other devices electrically connected to the terminal device, and may edit the document through a keyboard electrically connected to the terminal device.

When editing the document, the user may invoke the calendar function in the document to inform the terminal device that a calendar needs to be created at a current position. An operation of invoking the calendar function may be realized by inserting a calendar identifier at a corresponding position of the document. The calendar identifier may include any symbol such as rectangle, circle, and the calendar identifier may have any color such as white, yellow. When the user inserts the calendar identifier into the document, it may be considered that the user has invoked the calendar function.

When the terminal device detects that the calendar identifier is inserted, a corresponding calendar may be created. After the terminal device creates the calendar, the terminal device may allocate a label to the calendar to make the calendar unique. The label may include a corresponding identification number, identification code and other identifiers that can make the calendar unique in essence.

After the calendar is created, the calendar may be displayed in the current document, so that the user can visually see the created calendar. The calendar may be an initial calendar with only time information.

Step 102, add, in response to receiving a first addition request for adding a target event corresponding to target time in the calendar, the target event in the calendar.

The user may view an initial calendar displayed on the display interface, and select a corresponding target time in the initial calendar as required, and add corresponding target event information for the target time. The target time here may include a target date. For example, the user wants to add an updating event of updating document information in a document A on March 15. In this case, the user may select March 15 from a displayed calendar B, and add the updating event to an adding area corresponding to March 15. After viewing the updating event, the user can know that the updating event needs to be performed on March 15. The target time here may also include a target moment. For example, the updating event may be determined to be performed at 11:00 on March 15.

In some application scenarios, when the user selects the target time, an information edit box corresponding to the target time may be displayed, and the user may record information related to the target event in the information edit box. After the user completes recording, the terminal device may save the initial calendar with the recorded information of the target event to form the target calendar.

Step 103, display a target calendar added with the target event in the document.

After the target event is successfully added to the initial calendar, the calendar recording the target event may be considered as the target calendar successfully edited by the user. The terminal device may then display the target calendar in the document. In some application scenarios, information for multiple time points may be displayed on the calendar. Therefore, the display area corresponding to each target event may be determined according to multiple target times. In this way, multiple target events may be displayed orderly in the calendar at the same time.

In this embodiment, a calendar is firstly displayed in a document in response to receiving an invoking request for invoking a calendar function in the document, then a target event is added in the calendar in response to receiving a first addition request for adding the target event corresponding to target time in the calendar; and finally a target calendar added with the target event is displayed in the document. In this way, the target event may be displayed in the document through the target calendar, so that a document editor or other users related to the document, when viewing the document, can visually see specific events that need to be performed at a specific time point.

Figure 2:
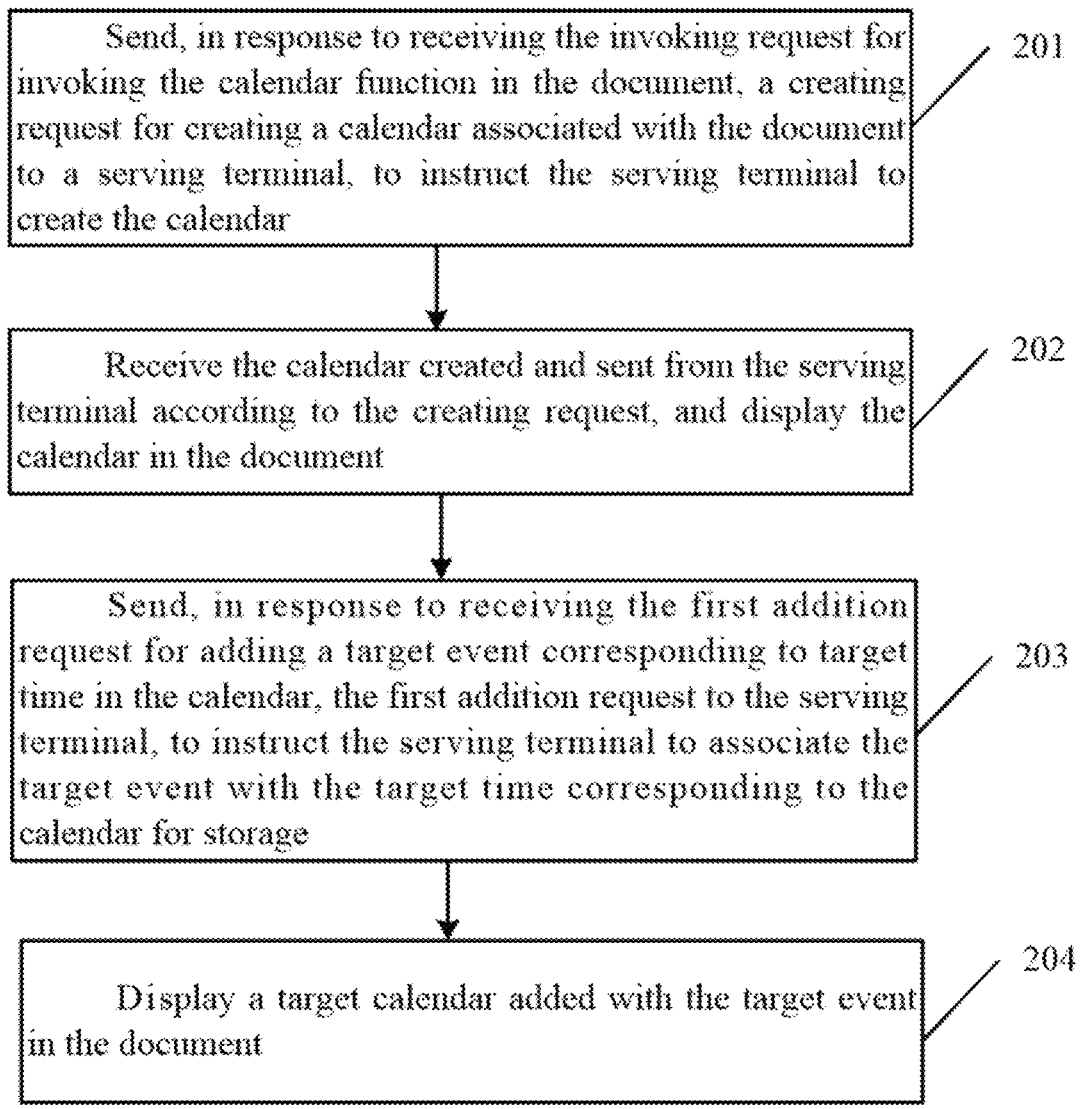
FIG. 2 is a flowchart of another document editing method according to an embodiment of the present disclosure.

Reference is made to FIG. 2, which is a flowchart of another document editing method according to an embodiment of the present disclosure. As shown in FIG. 2, the document editing method may include the steps 201 to 204.

Step 201, send, in response to receiving the invoking request for invoking the calendar function in the document, a creating request for creating a calendar associated with the document to a serving terminal, to instruct the serving terminal to create the calendar.

After receiving the invoking request from the user, the terminal device may create a calendar on the terminal device or request the serving terminal to create a calendar. That is to say, the terminal device may send a creating request to the serving terminal. After receiving the creating request, the serving terminal may create a calendar and send the created calendar to the terminal device.

The creating request may be automatically sent to the serving terminal when the terminal device receives the invoking request. For example, the terminal device may send a creating request for creating a calendar corresponding to a calendar identifier to the serving terminal when the terminal device detects that the user has inserted the calendar identifier.

Step 202, receive the calendar created and sent from the serving terminal according to the creating request, and display the calendar in the document.

After the serving terminal creates the calendar, the created calendar may be returned to the terminal device. When other users view the document, the terminal device may display information content corresponding to the calendar to the users.

Step 203, send, in response to receiving the first addition request for adding a target event corresponding to target time in the calendar, the first addition request to the serving terminal, to instruct the serving terminal to associate the target event with the target time corresponding to the calendar for storage.

The calendar created by the serving terminal for the first time may be the initial calendar with only time information. After receiving the initial calendar, the terminal device may display the initial calendar. In this case, the user may select the target time for which the target event needs to be added on the initial calendar. Then the corresponding target event is added for the target time. In some application scenarios, when the user selects the target time, the information edit box corresponding to the target time may also be displayed, and the user may record relevant information of the target event in the information edit box. After the user completes recording, the terminal device may send the target time and the target event to the serving terminal. After receiving the target time and the target event, the serving terminal may associate the target event with the target time corresponding to the initial calendar for storage.

Step 204, display a target calendar added with the target event in the document.

In some application scenarios, after the serving terminal associates the target event with the target time corresponding to the initial calendar for storage, the serving terminal may send the target calendar associated with the target event to the terminal device, so that the terminal device may display the target calendar. In other application scenarios, after the serving terminal associates the target event with the target time corresponding to the initial calendar for storage, the serving terminal may send feedback information of successful association to the terminal device, and the terminal device may save the target calendar. When the user views the document again, the target calendar may be displayed in the document.

In this embodiment, in response to receiving the invoking request for invoking the calendar function in the document, a creating request for creating a calendar associated with the document is sent to the serving terminal, to instruct the serving terminal to create the calendar; the calendar created and sent from the serving terminal according to the creating request is received, and the calendar is displayed in the document; in response to receiving the first addition request for adding a target event corresponding to target time in the calendar, the first addition request is sent to the serving terminal, to instruct the serving terminal to associate the target event with the target time corresponding to the calendar for storage; finally, a target calendar added with the target event is displayed in the document. In this way, the target calendar is created in the document through the serving terminal, viewing requests of multiple terminal devices can be responded, so that multiple users can browse the document online at the same time.

In some optional implementations, the creating request sent to the serving terminal includes at least one of a document identification code of the document, a user identification code of a user editing the document; and the calendar created by the serving terminal is associated with the document identification code of the document and the user identification code of the user. The document identification code and the user identification code may be acquired by the terminal device in advance and both of them are unique. When sending the creating request to the serving terminal, the terminal device may send at least one of the document identification code of the current document and the user identification code of the current user to the serving terminal.

In some application scenarios, when receiving at least one of the document identification code and the user identification code, the serving terminal may associate the calendar created according to the creating request with the document identification code.

In some application scenarios, if multiple target calendars need to be created in the same document, the serving terminal may determine the identification code of each calendar based on the received document identification code, so that the identification code of each calendar may be unique. When receiving a viewing request for viewing the document, the serving terminal may display the calendar corresponding to a calendar identification code in the document and send the document to a corresponding terminal device. In this way, when the user browses a corresponding position in the document, the user may view the unique target calendar corresponding to the location. The calendar identification code here may be a specific number or letter with the document identification code as a suffix, as long as calendar the identification code can distinguish the calendar from other calendars in essence.

In other application scenarios, after determining the calendar identification code corresponding to the calendar, the serving terminal may send the calendar identification code to the terminal device. The terminal device may associate the calendar identification code with the corresponding calendar for storage based on the received calendar identification code, and display the calendar on the display interface when the user browses the position corresponding to the calendar.

By associating the calendar with the document identification code and the user identification code, one of the calendar, the document identification code and the user identification code may be used to find the remaining two of them. In other words, by searching for the user identification code, the user may find all documents edited by the user and all calendars created by the user. By searching for the document identification code, the user may find all users who have edited the document and all calendars in the document. By searching for the calendar, the user may find the document where the calendar is located and all users who have edited the document.

In some optional implementations, in a case that the target event is saved on the terminal device, the document editing method may also include: recording, in response to receiving a second adding request for adding a reminder event corresponding to the target event in the calendar, the reminder event.

After the target event is added, the user may set a reminder function for the target event, that is, add a reminder event corresponding to the target event. After the user adds the reminder event, the terminal device may associate the reminder event with the corresponding target event for storage. The reminder event added here may be a reminder event for issuing a reminder for specific time points. For example, a reminder corresponding to the target event of the Children's Day activities held on that day is issued only for Jun. 1, 2020. The reminder event may also be a circular reminder event. For example, a reminder corresponding to the target event of summarizing the work of this week is issued every Friday.

In some optional implementations, in a case that the target event is saved on the serving terminal, the document editing method may also include: sending, in response to receiving a second adding request for adding a reminder event corresponding to the target event in the calendar, the second adding request to the serving terminal, to instruct the serving terminal to associate the reminder event indicated by the second adding request with the target event.

After receiving the reminder event that the user needs to add, the terminal device may send information content corresponding to the reminder event to the serving terminal, and instruct the serving terminal to associate the reminder event with the corresponding target event.

In some optional implementations, whether the reminder event is saved in the terminal device or the serving terminal, the document editing method may also include: displaying, in response to detecting that current time matches the target time corresponding to the target event, reminder information corresponding to the reminder event.

In other words, when the target time corresponding to the reminder event is reached, reminder information may be sent to the user. The reminder information here may include email information, SMS information used to remind users, or other forms of information that can be used to essentially remind users to perform the target event. The email information or SMS information may include the position information of the document and the corresponding target event information, such as document link for viewing the document. The user may quickly find the corresponding document through the reminder information, and can quickly perform the target event.

In a case that the target event is saved on the terminal device, if the terminal device detects that the current time is the target time corresponding to the target event added to the corresponding calendar, the terminal device may send a corresponding request to instruct the serving terminal to send reminder information to the corresponding user through the user identification code.

In a case that the target event is saved on the serving terminal, when the serving terminal detects that the current time is the target time corresponding to the target event associated with the corresponding calendar, the serving terminal may directly send reminder information to the corresponding user through the user identification code.

In other application scenarios, a user access permission may be set for the document. In this way, when sending reminder information, reminder information may be sent to authorized users at the same time. After receiving the reminder information, the authorized users may find the corresponding document based on the location information in the reminder information. Corresponding operations may also be performed through target event information in the reminder information.

Figure 3:
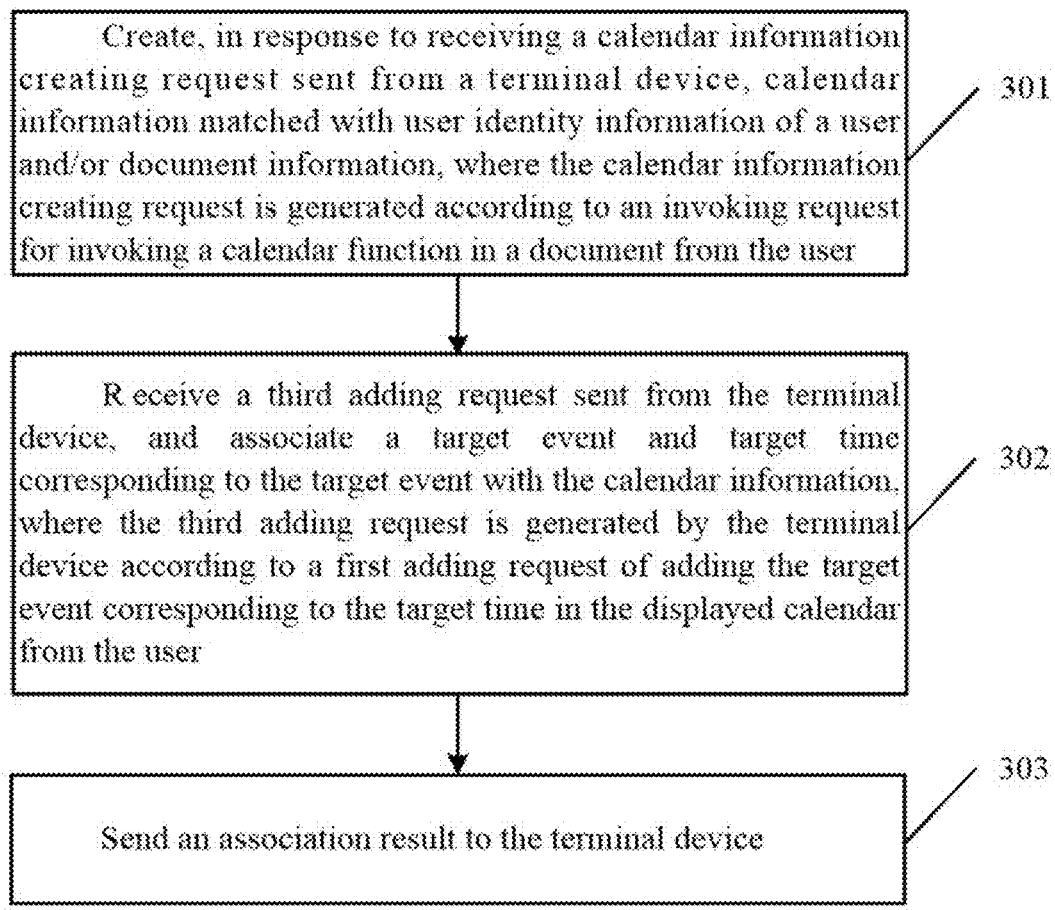
FIG. 3 is a flowchart of another document editing method according to an embodiment of the present disclosure.

Reference is made to FIG. 3, which is a flowchart of a document editing method according to an embodiment of the present disclosure. The document editing method is applied to the serving terminal. As shown in FIG. 3, the document editing method may include the steps 301 to 303.

Step 301, create, in response to receiving a calendar information creating request sent from a terminal device, calendar information matched with user identity information of a user and/or document information, where the calendar information creating request is generated according to an invoking request for invoking a calendar function in a document from the user.

The user identity information here may be, for example, the user identification code described above, and the document information may be, for example, the document identification code described above. After receiving the invoking request, the terminal device may send the creating request to the serving terminal, and the serving terminal may create the corresponding calendar information in response to the creating request. The calendar information here may include a calendar identification code corresponding to the document.

Step 302, receive a third adding request sent from the terminal device, and associate a target event and target time corresponding to the target event with the calendar information, where the third adding request is generated by the terminal device according to a first adding request of adding the target event corresponding to the target time in the displayed calendar from the user.

The third adding request here is used to request the serving terminal to associate the target calendar with the target event.

For the implementation details of the above steps 301 to 302, the description of step 201 and step 203 may be referred to, which is not repeated here for the sake of brevity of the specification.

Step 303, send an association result to the terminal device. The association result here may be obtained based on the following steps 1 and 2.

Step 1, send, in response to determining that the target event and the target time corresponding to the target event are successfully associated with the calendar information, a first association result indicating the successful association of the target event and the calendar information to the terminal device.

After the terminal device receives the first association result, it may be considered that the target calendar has been created successfully, and then the reminder information corresponding to the first association result may be displayed on the display interface, so that the user can intuitively know that the target calendar has been created successfully.

Step 2, send, in response to determining that the target event and the target time corresponding to the target event are failed to be associated with the calendar information, a second association result indicating the failed association of the target event and the calendar information to the terminal device, where the second association result includes a reason for the failed association.

After the terminal device receives the above second association result, it may be considered that it is failed to create the target calendar. The terminal device may also display the reminder information corresponding to the second association result on the display interface to inform the user of the failed creation, and may display the received specific reason for the failed creation, so that the user can correct an error operation according to the specific reason, and then can perform a relevant operation again to successfully create the target calendar.

In some optional implementations, the operation of creating calendar information matched with user identity information of a user and/or document information in the above step 301 may specifically include: creating a calendar matched with the user identity information of the user and/or the document information. Before the above step 302, the document editing method may also include: sending the created calendar to the terminal device, where the terminal device displays the calendar in the document.

The calendar displayed by the terminal device here may be the above initial calendar. That is, the serving terminal may create the above initial calendar according to the creating request, and then send the initial calendar to the terminal device. The terminal device may display the initial calendar on the display interface after receiving the initial calendar. Then the user may select the corresponding target time through the displayed initial calendar and add the corresponding target event. Here, the description of step 202 may be referred for the specific implementation details, which is not be repeated here for the sake of brevity of the specification.

In some optional implementations, the document editing method may also include the following steps 1 and 2.

Step 1, add, in response to receiving a second adding request for adding a reminder event corresponding to the target event in the calendar, the reminder event in the calendar information.

Step 2, send, in response to detecting that current time matches the target time corresponding to the target event, reminder information corresponding to the reminder event to a user corresponding to the user identity information.

After receiving the reminder event that the user needs to add, the terminal device may send the information content corresponding to the reminder event to the serving terminal, and the serving terminal may add the reminder event to the corresponding calendar information after receiving the second adding request.

When detecting that the current time is the target time corresponding to the target event, the serving terminal may send reminder information to the corresponding user through the user identity information.

In some optional implementations, the document editing method may also include: sending, in response to receiving a viewing request for viewing a target document with the created calendar information, the target document; and instructing the terminal device to display a target calendar added with the target event in the displayed target document.

After the serving terminal creates the corresponding target calendar in the document, the target calendar may be accessed by multiple terminal devices. That is, after the user sends a view request for viewing the target document through the terminal device, the serving terminal may send, in response to the viewing request, the target document with created the target calendar to the terminal device sending the viewing request, so that the user can visually see the target calendar information in the document.

In some application scenarios, multiple users may edit the same document through their own terminal devices to create the target calendar they want to create. In this document, after the target calendar is successfully created, other users who have an access authority to the document can also see the successfully created target calendar, which can then realize the function of multi-person collaboration.

Figure 4:
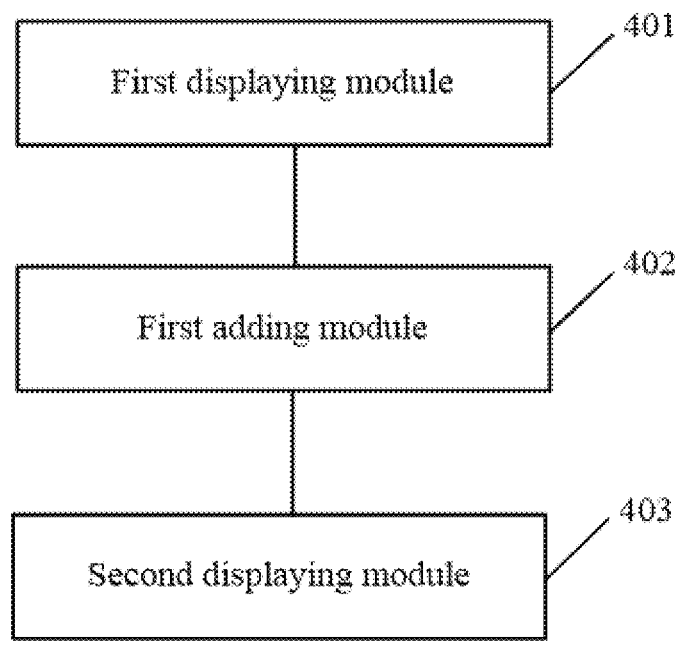
FIG. 4 is a schematic structural diagram of a document editing apparatus according to an embodiment of the present disclosure.

Reference is made to FIG. 4, which is a schematic structural diagram of a document editing apparatus according to an embodiment of the present disclosure. As shown in FIG. 4, the document editing apparatus includes a first displaying module 401, a first adding module 402, and a second displaying module 403. The first displaying module 401 is configured to display, in response to receiving an invoking request for invoking a calendar function in a document, a calendar in the document. The first adding module 402 is configured to add, in response to receiving a first addition request for adding a target event corresponding to target time in the calendar, the target event in the calendar. The second displaying module 403 is configured to display a target calendar added with the target event in the document.

It should be noted that, the specific processing and the technical effect of the first displaying module 401, the first adding module 402, and the second displaying module 403 of the document editing apparatus may refer to the relevant descriptions of steps 101 to 103 in the corresponding embodiment of FIG. 1 respectively, which will is not repeated here.

In some optional implementations of this embodiment, the first displaying module 401 is further configured to: send, in response to receiving the invoking request for invoking the calendar function in the document, a creating request for creating a calendar associated with the document to a serving terminal, to instruct the serving terminal to create the calendar; and receive the calendar created and sent from the serving terminal according to the creating request, and display the calendar in the document. The first adding module 402 is further configured to: send, in response to receiving the first addition request for adding a target event corresponding to target time in the calendar, the first addition request to the serving terminal, to instruct the serving terminal to associate the target event with the target time corresponding to the calendar for storage.

In some optional implementations of this embodiment, the creating request sent to the serving terminal includes at least one of a document identification code of the document, a user identification code of a user editing the document; and the calendar created by the serving terminal is associated with the document identification code of the document and the user identification code of the user.

In some optional implementations of this embodiment, the document editing apparatus further includes a recording module configured to record, in response to receiving a second adding request for adding a reminder event corresponding to the target event in the calendar, the reminder event.

In some optional implementations of this embodiment, the document editing apparatus further includes a second adding module configured to send, in response to receiving a second adding request for adding a reminder event corresponding to the target event in the calendar, the second adding request to the serving terminal, to instruct the serving terminal to associate the reminder event indicated by the second adding request with the target event.

In some optional implementations of this embodiment, the document editing apparatus further includes a third displaying module configured to display, in response to detecting that current time matches the target time corresponding to the target event, reminder information corresponding to the reminder event.

Figure 5:
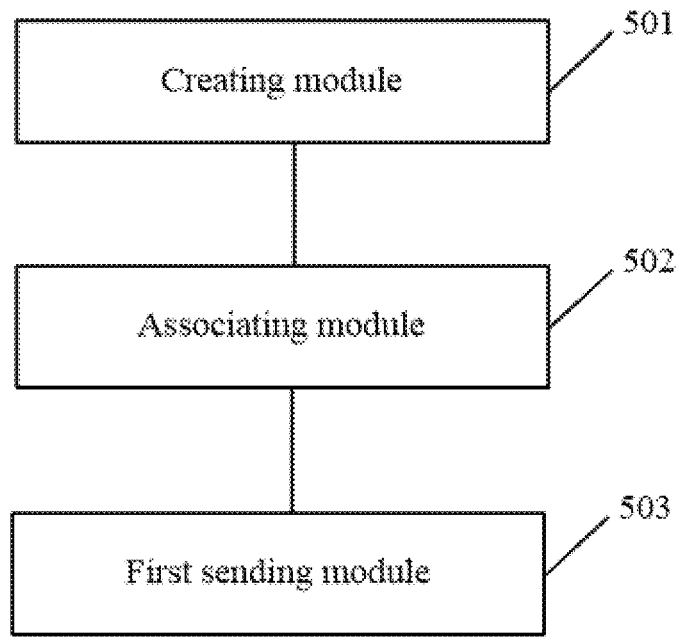
FIG. 5 is a schematic structural diagram of another document editing apparatus according to an embodiment of the present disclosure.

Reference is made to FIG. 5, which is a schematic structural diagram of another document editing apparatus according to an embodiment of the present disclosure. As shown in FIG. 5, the document editing apparatus includes a creating module 501, an associating module 502 and a first sending module 503. The creating module 501 is configured to create, in response to receiving a calendar information creating request sent from a terminal device, calendar information matched with user identity information of a user and/or document information, where the calendar information creating request is generated according to an invoking request for invoking a calendar function in a document from the user. The associating module 502 is configured to receive a third adding request sent from the terminal device, and associate a target event and target time corresponding to the target event with the calendar information, where the third adding request is generated by the terminal device according to a first adding request of adding the target event corresponding to the target time in the displayed calendar from the user. The first sending module 503 is configured to send an association result to the terminal device.

It should be noted that, the specific processing and the technical effect of the creating module 501, the associating module 502 and the first sending module 503 of the document editing apparatus may refer to the relevant descriptions of steps 301 to 303 in the corresponding embodiment of FIG. 3 respectively, which will is not repeated here.

In some optional implementations of this embodiment, the creating module 501 is further configured to create a calendar matched with the user identity information of the user and/or the document information; and the document editing apparatus further includes a second sending module configured to, before receiving the third adding request sent from the terminal device and associating the target event and the target time corresponding to the target event with the calendar information, send the created calendar to the terminal device, where the terminal device displays the calendar in the document.

In some optional implementations of this embodiment, the document editing apparatus further includes a reminding module configured to: add, in response to receiving a second adding request for adding a reminder event corresponding to the target event in the calendar, the reminder event in the calendar information; and send, in response to detecting that current time matches the target time corresponding to the target event, reminder information corresponding to the reminder event to a user corresponding to the user identity information.

In some optional implementations of this embodiment, the document editing apparatus further includes a third sending module configured to: send, in response to receiving a viewing request for viewing a target document with the created calendar information, the target document; and instruct the terminal device to display a target calendar added with the target event in the displayed target document.

Figure 6:
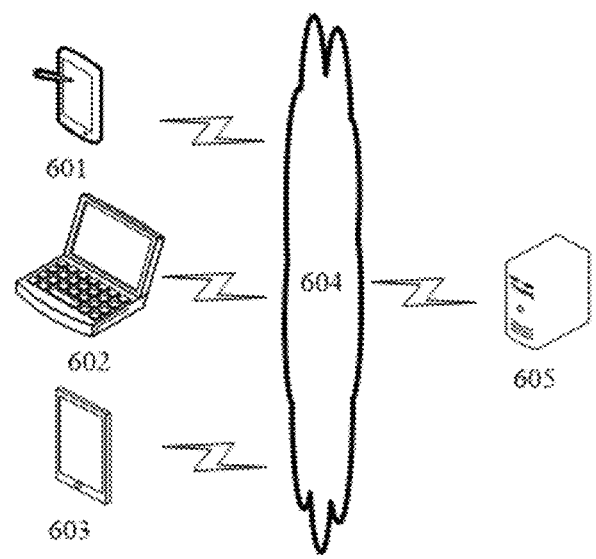
FIG. 6 is an exemplary system architecture to which a document editing method according to an embodiment of the present disclosure may be applied.

Reference is made to FIG. 6, which is an exemplary system architecture to which a document editing method according to an embodiment of the present disclosure may be applied.

As shown in FIG. 6, the system architecture may include terminal devices 601, 602 and 603, a network 604 and a server 605. The network 604 is configured to provide medium of a communication link between the terminal devices 601, 602, 603 and the server 605. The network 804 may include various types of connections, such as wired, wireless communication links or optical fiber cable. The terminal devices and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The terminal devices 601, 602 and 603 may interact with the server 605 over the network 604, to receive or transmit messages. The terminal devices 601, 602 and 603 may be installed with various clients, such as video publishing browser application, search application and news application.

The terminal devices 601, 602 and 603 may be implemented by hardware or software. In a case that the terminal devices 601, 602 and 603 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 601, 602 and 603 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 605 may provide various services. For example, the server 605 is configured to receive a document acquisition request transmitted from the terminal devices 601, 602 and 603, analyze and process the document acquisition request and send a result of analyzing and processing (such as document information corresponding to the acquisition request) to the terminal devices 601, 602 and 603.

It should be noted that, the document editing method described in the embodiments of the present disclosure may be performed by the server or the terminal device. Accordingly, the document editing apparatus may be arranged in the server or the terminal device.

It should be understood that the numbers of terminal device, network and server in FIG. 6 are only schematic. Any number of terminal device, network and server may be provided according to actual need.

Figure 7:
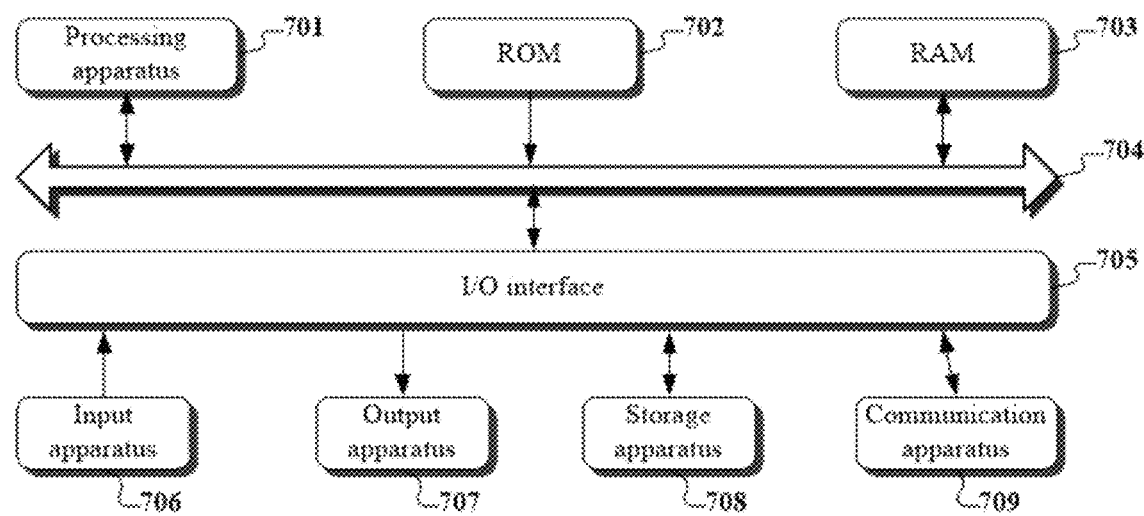
FIG. 7 is a schematic diagram of a basic structure of an electronic device according to an embodiment of the present disclosure.

Reference is made to FIG. 7, which shows a schematic structural diagram of an electronic device (for example a server shown in FIG. 6) for implementing the embodiment of the present disclosure. The electronic device shown in FIG. 7 is only schematic, and does not limit the functions and usage of the embodiments of the present disclosure.

As shown in FIG. 7, the electronic device may include a processing apparatus (such as a central processor and a graphic processor) 701. The processing apparatus may perform various appropriate actions and processing by executing programs stored in a read-only memory (ROM) 702 or programs uploaded from a storage apparatus 708 to a random access memory (RAM) 703. Various programs and data required for operations of the electronic device are also stored in the RAM 703. The processing apparatus 701, the ROM 702 and the RAM 703 are connected to each other through the bus 704. An input/output (I/O) interface 705 is also connected to the bus 704.

Generally, the following components are connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device to communicate with other device in a wired or wireless manner to exchange data. Although FIG. 7 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

The computer readable medium may be included in the electronic device described above, or may exist independently and is not installed in the electronic device.

The computer readable storage medium carries one or more programs. The one or more programs, when being executed by the electronic device, causes the electronic device to perform operations: displaying, in response to receiving an invoking request for invoking a calendar function in a document, a calendar in the document; adding, in response to receiving a first addition request for adding a target event corresponding to target time in the calendar, the target event in the calendar; and displaying a target calendar added with the target event in the document.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the module do not limit the module in a certain case. For example, the first displaying module may be referred to as "a module configured to display, in response to receiving an invoking request for invoking a calendar function in a document, a calendar in the document".

The functions described above herein may be performed at least partially by one or more hardware logical components. For example, without limitation, exemplary types of hardware logic components that can be used include: a field programmable gate array (FPGA), an application specific integrated circuit (ASIC), an application specific standard product (ASSP), a system on chip (SOC), a complex programmable logic device (CPLD) and so on.

In the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A method of editing a document, comprising:
   inserting a calendar identifier at a position of the document to invoke a calendar function while editing the document;
   displaying a calendar in the document, wherein the calendar comprises time information, and wherein the calendar is created in response to detecting an insertion of the calendar identifier in the document;
   forming a target calendar by adding, in response to receiving a first addition request for adding a target event corresponding to a target time in the calendar, the target event in the calendar, wherein the target event comprises an event associated with updating the document; and
   displaying the target calendar in the document, wherein the displaying the target calendar in the document enables a plurality of users that have access authority to the document to view the target event through the target calendar while viewing the document.

2. The method according to the claim 1, wherein the method further comprises:
   sending, in response to receiving an invoking request for invoking the calendar function in the document, a creating request for creating a calendar associated with the document to a serving terminal, to instruct the serving terminal to create the calendar; and
   receiving the calendar created and sent from the serving terminal according to the creating request, and displaying the calendar in the document, and
   the adding, in response to receiving a first addition request for adding a target event corresponding to target time in the calendar, the target event in the calendar comprises:
   sending, in response to receiving the first addition request for adding a target event corresponding to target time in the calendar, the first addition request to the serving terminal, to instruct the serving terminal to associate the target event with the target time corresponding to the calendar for storage.

3. The method according to claim 2, wherein the creating request sent to the serving terminal comprises at least one of a document identification code of the document, a user identification code of a user editing the document; and
   the calendar created by the serving terminal is associated with the document identification code of the document and the user identification code of the user.

4. The method according to claim 2, further comprising:
   sending, in response to receiving a second adding request for adding a reminder event corresponding to the target event in the calendar, the second adding request to the serving terminal, to instruct the serving terminal to associate the reminder event indicated by the second adding request with the target event.

5. The method according to claim 1, further comprising:
   recording, in response to receiving a second adding request for adding a reminder event corresponding to the target event in the calendar, the reminder event.

6. The method according to claim 5, further comprising:
   displaying, in response to detecting that current time matches the target time corresponding to the target event, reminder information corresponding to the reminder event.

7. A non-transitory computer-readable medium storing a computer program, bearing computer-readable instructions that upon execution on a computing device cause the computing device at least to perform the method according to claim 1.

8. A method of editing a document, comprising:
   creating, in response to receiving a calendar information creating request sent from a terminal device, a calendar matched with user identity information of a user or document information, wherein the calendar information creating request is generated according to an invoking request for invoking a calendar function in a document from the terminal device, wherein the calendar function is invoked by inserting a calendar identifier at a position of the document, and wherein the calendar comprise time information and is displayed on the terminal device;
   receiving an adding request sent from the terminal device, and associating a target event and a target time corresponding to the target event with the calendar, wherein the adding request is generated by the terminal device according to a request of adding the target event corresponding to the target time in the displayed calendar, wherein the target event comprises an event associated with updating the document; and
   sending a target calendar to the terminal device for display in the document, wherein the display of the target calendar in the document enables a plurality of users that have access authority to the document to view the target event through the target calendar while viewing the document.

9. The method according to claim 8, wherein before receiving the adding request sent from the terminal device and associating the target event and the target time corresponding to the target event with the calendar, the method further comprises:
   sending the calendar to the terminal device, wherein the terminal device displays the calendar in the document.

10. The method according to claim 9, further comprising, adding, in response to receiving a second adding request for adding a reminder event corresponding to the target event in the calendar, the reminder event in the calendar information; and
   sending, in response to detecting that current time matches the target time corresponding to the target event, reminder information corresponding to the reminder event to a user corresponding to the user identity information.

11. The method according to claim 8, further comprising:
   sending, in response to receiving a viewing request for viewing a target document with the created calendar information, the target document; and
   instructing the terminal device to display a target calendar added with the target event in the displayed target document.

12. A apparatus of editing a document, comprising:
   at least one processor; and at least one memory communicatively coupled to the at least one processor and storing instructions that upon execution by the at least one processor cause the apparatus to perform the method according to claim 8.

13. The apparatus of claim 12, wherein before receiving the adding request sent from the terminal device and associating the target event and the target time corresponding to the target event with the calendar information, the at least one memory further storing instructions that upon execution by the at least one processor cause the apparatus to:
send the calendar to the terminal device, wherein the terminal device displays the calendar in the document.

14. The apparatus of claim 13, the at least one memory further storing instructions that upon execution by the at least one processor cause the apparatus to:
add, in response to receiving a second adding request for adding a reminder event corresponding to the target event in the calendar, the reminder event in the calendar information; and
send, in response to detecting that current time matches the target time corresponding to the target event, reminder information corresponding to the reminder event to a user corresponding to the user identity information.

15. A apparatus of editing a document, comprising:
at least one processor; and
at least one memory communicatively coupled to the at least one processor and storing instructions that upon execution by the at least one processor cause the apparatus to:
insert a calendar identifier at a position of the document to invoke a calendar function while editing the document;
display a calendar in the document, wherein the calendar comprises time information, and wherein the calendar is created in response to detecting an insertion of the calendar identifier in the document;
form a target calendar by adding, in response to receiving a first addition request for adding a target event corresponding to a target time in the calendar, the target event in the calendar, wherein the target event comprises an event associated with updating the document; and
display the target calendar in the document, wherein the displaying the target calendar in the document enables a plurality of users that have access authority to the document to view the target event through the target calendar while viewing the document.

16. The apparatus of claim 15, wherein displaying a calendar in the document comprises:
sending, in response to receiving an invoking request for invoking the calendar function in the document, a creating request for creating a calendar associated with the document to a serving terminal, to instruct the serving terminal to create the calendar; and
receiving the calendar created and sent from the serving terminal according to the creating request, and displaying the calendar in the document, and
wherein the at least one memory further storing instructions that upon execution by the at least one processor cause the apparatus to:
send, in response to receiving the first addition request for adding a target event corresponding to target time in the calendar, the first addition request to the serving terminal, to instruct the serving terminal to associate the target event with the target time corresponding to the calendar for storage.

17. The apparatus of claim 16, wherein the creating request sent to the serving terminal comprises at least one of a document identification code of the document, a user identification code of a user editing the document; and
the calendar created by the serving terminal is associated with the document identification code of the document and the user identification code of the user.

18. The apparatus of claim 16, the at least one memory further storing instructions that upon execution by the at least one processor cause the apparatus to:
send, in response to receiving a second addition request for adding a reminder event corresponding to the target event in the calendar, the second adding request to the serving terminal, to instruct the serving terminal to associate the reminder event indicated by the second addition request with the target event.

19. The apparatus of claim 18, the at least one memory further storing instructions that upon execution by the at least one processor cause the apparatus to:
display, in response to detecting that current time matches the target time corresponding to the target event, reminder information corresponding to the reminder event.

20. The apparatus of claim 15, the at least one memory further storing instructions that upon execution by the at least one processor cause the apparatus to:
record, in response to receiving a second addition request for adding a reminder event corresponding to the target event in the calendar, the reminder event.

\* \* \* \* \*